US012658473B2

(12) United States Patent
Lee et al.

(10) Patent No.: US 12,658,473 B2
(45) Date of Patent: Jun. 16, 2026

(54) METHOD FOR MANUFACTURING GEL POLYMER ELECTROLYTE SECONDARY BATTERY AND GEL POLYMER ELECTROLYTE SECONDARY BATTERY OBTAINED THEREBY

(71) Applicant: LG ENERGY SOLUTION, LTD., Seoul (KR)

(72) Inventors: Jung-Hoon Lee, Daejeon (KR); Yong-Hee Kang, Daejeon (KR); Ji-Hoon Ryu, Daejeon (KR); Yeo-Min Yoon, Daejeon (KR); Jae-Won Lee, Daejeon (KR); Bum-Young Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 385 days.

(21) Appl. No.: 17/911,790

(22) PCT Filed: Sep. 14, 2021

(86) PCT No.: PCT/KR2021/012518
§ 371 (c)(1),
(2) Date: Sep. 15, 2022

(87) PCT Pub. No.: WO2022/055331
PCT Pub. Date: Mar. 17, 2022

(65) Prior Publication Data
US 2023/0178801 A1 Jun. 8, 2023

(30) Foreign Application Priority Data
Sep. 14, 2020 (KR) ........................ 10-2020-0117957

(51) Int. Cl.
*H01M 10/0565* (2010.01)
*H01M 10/28* (2006.01)

(52) U.S. Cl.
CPC ..... *H01M 10/0565* (2013.01); *H01M 10/281* (2013.01); *H01M 2300/0082* (2013.01); *H01M 2300/0085* (2013.01)

(58) Field of Classification Search
CPC ........... H01M 10/0565; H01M 10/281; H01M 2300/0082; H01M 2300/0085; H01M 10/058
See application file for complete search history.

(56) References Cited

U.S. PATENT DOCUMENTS

| 2003/0049519 | A1* | 3/2003 | Ishida | ............... H01M 10/0587 |
| | | | | 429/57 |
| 2011/0183212 | A1 | 7/2011 | Takahashi et al. | |

(Continued)

FOREIGN PATENT DOCUMENTS

| JP | 2001-155779 A | 6/2001 |
| JP | 2001-210373 A | 8/2001 |

(Continued)

OTHER PUBLICATIONS

KR 10-1748362 machine English translation (Year: 2017).*

(Continued)

*Primary Examiner* — Michael L Dignan
(74) *Attorney, Agent, or Firm* — Morgan, Lewis & Bockius LLP

(57) ABSTRACT

The present disclosure relates to a method for manufacturing a secondary battery including a gel polymer electrolyte and a secondary battery obtained thereby. The method can inhibit thermal crosslinking of a gel polymer electrolyte during the wetting with an electrolyte, and facilitate thermal crosslinking after the wetting with an electrolyte is finished. In addition, the method can increase uniformity of thermal crosslinking by controlling the oxygen content in a cell.

14 Claims, 3 Drawing Sheets

(56) References Cited

U.S. PATENT DOCUMENTS

| | | | |
|---|---|---|---|
| 2011/0195314 A1 | 8/2011 | Yu et al. | |
| 2013/0095357 A1* | 4/2013 | Bhardwaj | H01M 10/0431 |
| | | | 29/623.2 |
| 2019/0173122 A1* | 6/2019 | Ellis | G01N 21/552 |
| 2019/0207183 A1* | 7/2019 | Park | H01M 50/105 |
| 2019/0252130 A1 | 8/2019 | Hasegawa et al. | |
| 2020/0365933 A1* | 11/2020 | Shin | H01M 10/058 |
| 2021/0359342 A1* | 11/2021 | Park | H01M 10/0525 |
| 2022/0102790 A1 | 3/2022 | Jung et al. | |

FOREIGN PATENT DOCUMENTS

| | | | | |
|---|---|---|---|---|
| JP | 2001-256826 A | 9/2001 | | |
| JP | 2002-110252 A | 4/2002 | | |
| JP | 2006-49158 A | 2/2006 | | |
| JP | 2011-154983 A | 8/2011 | | |
| JP | 2013-140676 A | 7/2013 | | |
| JP | 2013-149477 A | 8/2013 | | |
| JP | 2019-140345 A | 8/2019 | | |
| JP | 2019-537225 A | 12/2019 | | |
| KR | 10-2004-0008787 A | 1/2004 | | |
| KR | 10-2007-0088985 A | 8/2007 | | |
| KR | 10-0824869 B1 | 4/2008 | | |
| KR | 10-2010-0016919 A | 2/2010 | | |
| KR | 201660094065 A | * | 8/2016 | |
| KR | 10-2016-0134164 A | 11/2016 | | |
| KR | 10-1748362 | * | 6/2017 | H01M 10/04 |
| KR | 10-2017-0083387 A | 7/2017 | | |
| KR | 10-2019-0012843 A | 2/2019 | | |
| KR | 10-2019-0060522 A | 6/2019 | | |
| KR | 10-2019-0112656 A | 10/2019 | | |
| KR | 20190112656 | * | 10/2019 | |
| KR | 10-2019-0125228 A | 11/2019 | | |
| KR | 10-2020-0032842 A | 3/2020 | | |

OTHER PUBLICATIONS

Office Action issued in related Japanese Patent Application No. 2022-548026 dated Jul. 24, 2023.

The Extended European Search Report, dated Jan. 17, 2024 issued in corresponding European Patent Application No. 21867196.4.

International Search Report (with partial translation) and Written Opinion dated Jan. 3, 2022, for corresponding International Patent Application No. PCT/KR2021/012518.

Office Action issued in related Chinese Patent Application No. 202180011585.5, dated Mar. 4, 2025.

Office Action dated Apr. 17, 2025 issued in corresponding Korean Patent Application No. 10-2021-0122790.

Action issued in related Chinese Patent Application No. 202180011585.5 dated Aug. 12, 2025.

* cited by examiner

METHOD FOR MANUFACTURING GEL POLYMER ELECTROLYTE SECONDARY BATTERY AND GEL POLYMER ELECTROLYTE SECONDARY BATTERY OBTAINED THEREBY

TECHNICAL FIELD

The present disclosure relates to a method for manufacturing a lithium secondary battery including a gel polymer electrolyte and a gel polymer electrolyte secondary battery obtained thereby.

The present application claims priority to Korean Patent Application No. 10-2020-0117957 filed on Sep. 14, 2020 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Such lithium secondary batteries may be classified into lithium-ion batteries using a liquid electrolyte and lithium polymer batteries using a polymer electrolyte, depending on the electrolyte used specially therefor.

Lithium-ion batteries have an advantage of high capacity, but have a risk of electrolyte leakage and explosion due to the use of a lithium salt-containing liquid electrolyte. Therefore, lithium-ion batteries are disadvantageous in that they require a complicated battery design in order to provide against such a disadvantage.

On the other hand, lithium polymer batteries use a solid polymer electrolyte or an electrolyte-containing gel polymer electrolyte, and thus show improved safety and may have flexibility. Therefore, lithium polymer batteries may be developed into various types, such as compact batteries or thin film-type batteries.

The batteries using such a gel polymer electrolyte may be manufactured through a coating process or an injection process.

The coating process includes coating the surfaces of a positive electrode, a negative electrode and a separator with a composition for a gel polymer electrolyte, gelling the composition by heating or UV, combining the electrodes with the separator to form a cell, and further injecting a conventional electrolyte thereto. Such a process uses an additional non-aqueous organic solvent, and thus is not satisfactory in terms of thermal stability or secondary battery performance.

The injection process includes preparing a composition for forming a gel by mixing a polymerizable monomer and a polymerization initiator in a non-aqueous organic solvent containing a salt dissolved therein, injecting the composition to a battery including a stack cell formed by winding or stacking a positive electrode, a negative electrode and a separator, and gelling (crosslinking) the composition under suitable temperature and time conditions to obtain a secondary battery including a gel polymer electrolyte.

Such an injection process generally uses thermal crosslinking, and a radical thermal initiator is used for the purpose of thermal crosslinking. However, there is a limitation in use of such a radical thermal initiator undesirably.

DISCLOSURE

Technical Problem

The present disclosure is designed to solve the problems of the related art, and therefore the present disclosure is directed to making the reaction of a gel polymer electrolyte uniform in an injection-type gel polymer electrolyte lithium secondary battery using radical thermal initiation. Particularly, the present disclosure is directed to inhibiting room-temperature reaction of a thermal initiator and to increasing the crosslinking degree at high temperature.

Technical Solution

In one aspect of the present disclosure, there is provided a method for manufacturing a lithium secondary battery according to any one of the following embodiments.

According to the first embodiment, there is provided a method for manufacturing a lithium secondary battery, including the steps of:

(S1) inserting a stack cell including a separator interposed between a positive electrode and a negative electrode to a battery casing;

(S2) injecting a composition for a gel polymer electrolyte into the battery casing to which the stack cell is inserted;

(S3) sealing the battery casing under oxygen-containing atmosphere;

(S4) aging the product of (S3);

(S5) removing oxygen from the battery casing; and (S6) thermally curing the battery casing.

According to the second embodiment, there is provided the method for manufacturing a lithium secondary battery as defined in the first embodiment, wherein step (S3) is carried out at 130-150° C. for 1-10 seconds.

According to the third embodiment, there is provided the method for manufacturing a lithium secondary battery as defined in the first or the second embodiment, wherein step (S4) is carried out at room temperature for 72 hours or less.

According to the fourth embodiment, there is provided the method for manufacturing a lithium secondary battery as defined in any one of the first to the third embodiments, wherein step (S5) is a step of pressurizing the battery casing.

According to the fifth embodiment, there is provided the method for manufacturing a lithium secondary battery as defined in the fourth embodiment, wherein step (S5) is a step of inserting the battery casing between a pair of jigs facing each other and applying pressure thereto.

According to the sixth embodiment, there is provided the method for manufacturing a lithium secondary battery as defined in the fifth embodiment, wherein step (S5) includes pressurizing merely a predetermined portion in the battery casing.

According to the seventh embodiment, there is provided the method for manufacturing a lithium secondary battery as defined in the fourth embodiment, wherein the portion, not pressurized in step (S5), is cut, after step (S6).

According to the eighth embodiment, there is provided the method for manufacturing a lithium secondary battery as defined in the fourth embodiment, wherein step (S5) is carried out under a pressure of 3-15 kgf/cm².

According to the ninth embodiment, there is provided the method for manufacturing a lithium secondary battery as defined in any one of the first to the eighth embodiments, wherein step (S5) is carried out for 30 seconds to 10 minutes.

According to the tenth embodiment, there is provided the method for manufacturing a lithium secondary battery as defined in any one of the first to the ninth embodiments, wherein step (S6) is carried out at a temperature of 60-70° C.

According to the eleventh embodiment, there is provided the method for manufacturing a lithium secondary battery as defined in any one of the first to the ninth embodiments, wherein step (S6) is carried out for 5-24 hours.

According to the twelfth embodiment, there is provided the method for manufacturing a lithium secondary battery as defined in any one of the first to the eleventh embodiments, wherein the composition for a gel polymer electrolyte includes: a lithium salt; a non-aqueous organic solvent; a polymerization initiator; and at least one polymerizable compound selected from the group consisting of a polymerizable monomer, oligomer and copolymer.

In another aspect of the present disclosure, there is provided a lithium secondary battery according to the following embodiment.

According to the thirteenth embodiment, there is provided a lithium secondary battery obtained by the method as defined in any one of the first to the twelfth embodiments, which includes a stack cell provided with a gel polymer electrolyte layer between a positive electrode and a negative electrode, wherein the gel polymer electrolyte layer has a polymer matrix and is formed by thermal curing, the gel polymer electrolyte layer has a crosslinking degree of 80% or more, and the stiffness of the secondary battery is at least 10% higher than the stiffness of a secondary battery not subjected to step (S5).

Advantageous Effects

According to an embodiment of the present disclosure, it is possible to inhibit thermal crosslinking of a gel polymer electrolyte during the wetting with an electrolyte, and to facilitate thermal crosslinking after the wetting with an electrolyte is finished.

According to an embodiment of the present disclosure, it is possible to increase the uniformity of thermal crosslinking by controlling the oxygen content in a cell.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

FIG. 2 is a schematic view illustrating the jigs used according to an embodiment of the present disclosure.

FIG. 3 is a schematic sectional view illustrating a lithium secondary battery pressurized by using the jigs according to an embodiment of the present disclosure.

BEST MODE

Figure 1:
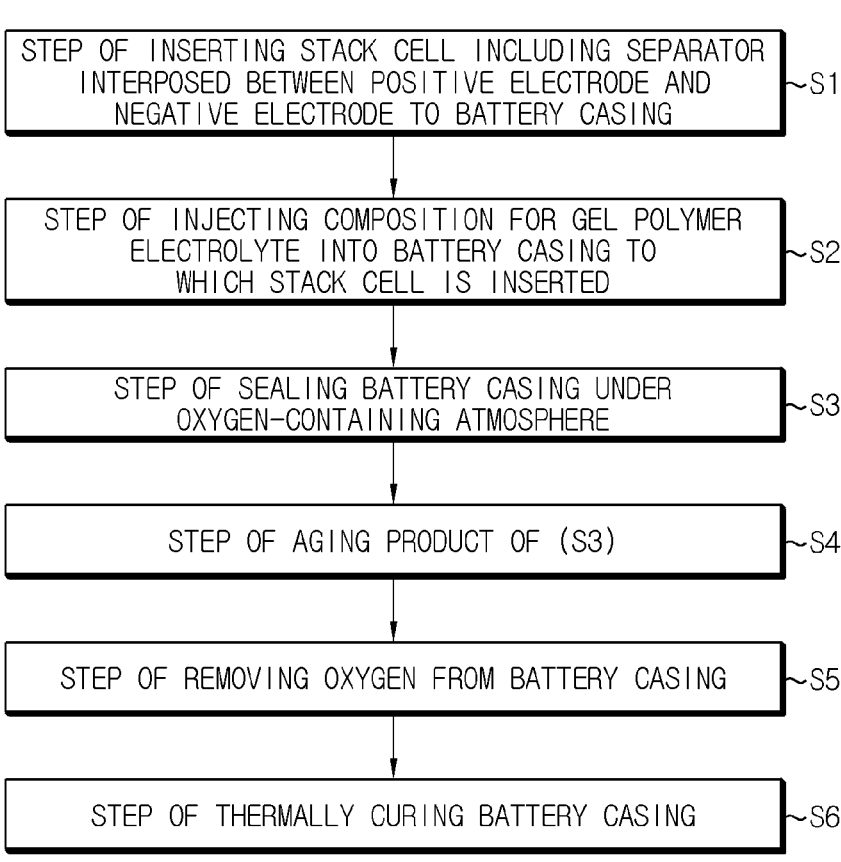
FIG. 1 is a flow chart illustrating the method for manufacturing a lithium secondary battery according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'about', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

Unless otherwise stated, '*' represents a linkage portion between the same or different atoms or end portions of the chemical formulae.

In addition, as used herein, 'substitution' refers to substitution of at least one hydrogen atom bound to a carbon atom with any element other than hydrogen, unless otherwise stated. For example, 'substitution' refers to substitution with a C1-C5 alkyl group or fluorine atom.

In general, a secondary battery using a gel polymer electrolyte is obtained by mixing a polymerizable monomer and/or oligomer (crosslinking agent) and a polymerization initiator in a non-aqueous organic solvent containing a salt dissolved therein to prepare a composition for forming a gel, injecting the composition to a battery casing to which a stack cell is inserted, carrying out aging, and carrying out gelling (crosslinking) of the composition under suitable temperature and time conditions.

The polymerization initiator used in such an injection process should not be converted into radicals during the wetting with an electrolyte. In addition, since the electrolyte is decomposed during the reaction at high temperature, it is difficult to use a polymerization initiator reactive at high temperature.

However, the polymerization initiators used in the conventional injection process shows a relatively small gap between the self-accelerating decomposition temperature and the half-life temperature, and thus it is difficult to control the polymerization initiators so that they may be stable at room temperature and may initiate reaction at low temperature.

Under these circumstances, the inventors of the present disclosure have conducted intensive studies to provide a method for manufacturing a lithium secondary battery, wherein a polymerization initiator can react in a thermal curing step, not in an electrolyte injection step, or the like, while using the conventional polymerization initiator as it is.

Particularly, according to an embodiment of the present disclosure, there is provided a method for manufacturing a lithium secondary battery, including the steps of:

(S1) inserting a stack cell including a separator interposed between a positive electrode and a negative electrode to a battery casing;

(S2) injecting a composition for a gel polymer electrolyte into the battery casing to which the stack cell is inserted;

(S3) sealing the battery casing under oxygen-containing atmosphere;

(S4) aging the product of (S3);

(S5) removing oxygen from the battery casing; and (S6) thermally curing the battery casing.

The inventors of the present disclosure are directed to providing a process which can inhibit room-temperature reaction of a polymerization initiator, while using the conventional polymerization initiator, and can maximize the conversion of monomers into a polymer at high temperature.

To accomplish this, a composition for a gel polymer electrolyte is injected, and then oxygen is further injected. When the inner part of a stack cell is impregnated with the composition for an electrolyte, the oxygen is removed and thermal curing is carried out. In other words, according to the present disclosure, oxygen is controlled to provide a process which inhibits room-temperature reaction of the polymerization initiator and maximizes the conversion of monomers into a polymer at high temperature.

First, as shown in FIG. 1, a stack cell including a positive electrode, a negative electrode and a separator interposed between the positive electrode and the negative electrode is manufactured, and then is introduced to a battery casing (S1).

In the method for manufacturing a lithium secondary battery according to an embodiment of the present disclosure, the stack cell may be obtained by a conventional method including interposing the separator between the negative electrode and the positive electrode, and winding the resultant structure into a jelly-roll shape. In addition to such a conventional winding process, the stack cell may be obtained by laminating (stacking) the separator between the positive electrode and the negative electrode, and folding the resultant structure.

Herein, each of the positive electrode, the negative electrode and the separator forming the stack cell may be any one used conventionally for manufacturing a lithium secondary battery.

(1) Positive Electrode

The positive electrode may be obtained by forming a positive electrode mixture layer on a positive electrode current collector. The positive electrode mixture layer may be formed by coating a positive electrode slurry including a positive electrode active material, a binder, a conductive material and a solvent onto a positive electrode current collector, followed by drying and pressing.

The positive electrode current collector is not particularly limited, as long as it causes no chemical change in the corresponding battery and has conductivity. Particular examples of the positive electrode current collector may include stainless steel, aluminum, nickel, titanium, baked carbon, copper or stainless steel surface-treated with carbon, nickel, titanium or silver, or the like.

The positive electrode active material is a compound capable of reversible lithium intercalation/deintercalation, and particular examples thereof include lithium composite metal oxides containing at least one metal, such as cobalt, manganese, nickel or aluminum, and lithium. More particularly, the lithium composite metal oxides may include lithium-manganese oxides (e.g. $LiMnO_2$, $LiMn_2O_4$, etc.), lithium-cobalt oxides (e.g., $LiCoO_2$, etc.), lithium-nickel oxides (e.g., $LiNiO_2$, etc.), lithium-nickel-manganese oxides (e.g., $LiNi_{1-Y}Mn_YO_2$ (wherein $0<Y<1$), $LiMn_{2-z}Ni_zO_4$ (wherein $0<Z<2$)), lithium-nickel-cobalt oxides (e.g., $LiNi_{1-Y1}Co_{Y1}O_2$ (wherein $0<Y1<1$)), lithium-manganese-cobalt oxides (e.g., $LiCo_{1-Y2}Mn_{Y2}O_2$ (wherein $0<Y2<1$), $LiMn_{2-z1}Co_{z1}O_4$ (wherein $0<Z1<2$)), lithium-nickel-manganese-cobalt oxides (e.g., $Li(Ni_pCo_qMn_{r1})O_2$ ($0<p<1$, $0<q<1$, $0<r1<1$, $p+q+r1=1$) or $Li(Ni_{p1}Co_{q1}Mn_{r2})O_4$ ($0<p1<2$, $0<q1<2$, $0<r2<2$, $p1+q1+r2=2$)), lithium-nickel-cobalt-transition metal (M) oxides (e.g., $Li(Ni_{p2}Co_{q2}Mn_{r3}MS_2)O_2$ (wherein M is selected from the group consisting of Al, Fe, V, Cr, Ti, Ta, Mg and Mo, and each of p2, q2, r3 and s2 represents the atomic proportion of each element satisfying $0<p2<1$, $0<q2<1$, $0<r3<1$, $0<s2<1$, and $p2+q2+r3+s2=1$)), or the like, and any one compound, or two or more compounds of them may be used.

Particularly, the lithium composite metal oxides may include $LiCoO_2$, $LiMnO_2$, $LiNiO_2$, lithium nickel manganese cobalt oxides (e.g. $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.5}Mn_{0.1}Co_{0.1})O_2$, or the like), or lithium nickel cobalt aluminum oxides (e.g., $Li(Ni_{0.5}Co_{0.15}Al_{0.05})O_2$, or the like) with a view to improvement of the capacity characteristics and stability of a battery.

The positive electrode active material may be used in an amount of 80-99 wt %, based on the total weight of the solid content in the positive electrode slurry.

The binder is an ingredient which assists binding between the active material and the conductive material and binding to the current collector. In general, the binder may be added in an amount of 1-30 wt % based on the total weight of the solid content in the positive electrode slurry. Particular examples of the binder include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer (EPDM), sulfonated EPDM, styrene-butadiene rubber, fluoro-rubber, various copolymers, or the like.

The conductive material may be added in an amount of 1-30 wt % based on the total weight of the solid content in the positive electrode slurry.

Such a conductive material is not particularly limited, as long as it causes no chemical change in the corresponding battery and has conductivity. Particular examples of the conductive material include: carbon powder, such as carbon black, acetylene black (or denka black), ketjen black, channel black, furnace black, lamp black or thermal black; graphite powder, such as natural graphite, artificial graphite or graphite having a well-developed crystal structure; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives.

The solvent may include an organic solvent, such as N-methyl-2-pyrrolidone (NMP), and may be used in such an amount that the solvent provides a desired level of viscosity, when the positive electrode active material and optionally the binder and the conductive material are incorporated thereto. For example, the solvent may provide a solid content of 50-95 wt %, preferably 70-90 wt %, in the positive electrode slurry including the positive electrode active material and optionally the binder and the conductive material.

(2) Negative Electrode

In addition, the negative electrode may be obtained by forming a negative electrode mixture layer on a negative electrode current collector. The negative electrode mixture layer may be formed by coating negative electrode slurry including a negative electrode active material, a binder, a conductive material and a solvent onto a negative electrode current collector, followed by drying and pressing.

The negative electrode current collector generally has a thickness of 3-500 μm. The negative electrode current collector is not particularly limited, as long as it has high conductivity, while not causing any chemical change in the corresponding battery. Particular examples of the negative electrode current collector include copper, stainless steel, aluminum, nickel, titanium, baked carbon, or copper or stainless steel surface-treated with carbon, nickel, titanium, silver, etc., aluminum-cadmium alloy, or the like. In addition, similarly to the positive electrode current collector, the negative electrode current collector may have fine surface irregularities formed on the surface thereof to increase the adhesion of a negative electrode active material, and may have various shapes, such as a film, a sheet, a foil, a net, a porous body, a foam or a non-woven web body.

In addition, the negative electrode active material may include at least one selected from the group consisting of a carbonaceous material capable of reversible lithium-ion intercalation/deintercalation, metal or alloy of metal with lithium, metal composite oxide, material capable of lithium doping/dedoping, and a transition metal oxide.

The carbonaceous material capable of reversible lithium-ion intercalation/deintercalation may include any carbonaceous negative electrode active material used currently in a lithium-ion secondary battery with no particular limitation. Typical examples of the carbonaceous material include crystalline carbon, amorphous carbon or a combination thereof. Particular examples of the crystalline carbon include graphite, such as amorphous, sheet-like, flake-like, spherical or fibrous natural graphite or artificial graphite, and particular examples of the amorphous carbon include soft carbon (low-temperature baked carbon) or hard carbon, mesophase pitch carbide, baked cokes, or the like.

The metal composite oxide that may be used is selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (wherein Me is Mn, Fe, Pb, Ge; Me' is Al, B, P, Si, element of Group 1, 2 or 3 in the Periodic Table, halogen; and $0 \leq x \leq 1$; $1 \leq y \leq 3$; and $1 \leq z \leq 8$).

The material capable of lithium doping/dedoping may include Si, $SiO_x$ ($0 < x < 2$), Si—Y alloy (wherein Y is an element selected from the group consisting of alkali metals, alkaline earth metals, Group 13 elements, Group 14 elements, transition metals, rare earth metal elements and combinations thereof, except Si), Sn, $SnO_2$, Sn—Y (wherein Y is an element selected from the group consisting of alkali metals, alkaline earth metals, Group 13 elements, Group 14 elements, transition metals, rare earth metal elements and combinations thereof, except Sn), or the like. At least one of such materials may be used in combination with $SiO_2$. Element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include lithium-containing titanium composite oxide (LTO), vanadium oxide, lithium vanadium oxide, or the like.

The negative electrode material may be used in an amount of 80-99 wt %, based on the total weight of the solid content in the negative electrode slurry.

The binder is an ingredient which assists binding among the conductive material, active material and the current collector. In general, the binder may be added in an amount of 1-30 wt %, based on the total weight of the solid content in the negative electrode slurry. Particular examples of the binder include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer (EPDM), sulfonated EPDM, styrene-butadiene rubber, fluoro-rubber, various copolymers thereof, or the like.

The conductive material is an ingredient for further improving the conductivity of the negative electrode active material, and may be added in an amount of 1-20 wt %, based on the total weight of the solid content of the negative electrode slurry. The conductive material may be the same or different as the conductive material used for manufacturing the positive electrode. Particular examples of the conductive material include: carbon powder, such as carbon black, acetylene black (or denka black), ketjen black, channel black, furnace black, lamp black or thermal black; graphite powder, such as natural graphite, artificial graphite or graphite having a well-developed crystal structure; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives.

The solvent may include water or an organic solvent, such as NMP, alcohol, or the like, and may be used in such an amount that the solvent provides a desired level of viscosity when the negative electrode active material and optionally the binder and the conductive material are incorporated thereto. For example, the solvent may provide a solid content of 50-95 wt %, preferably 70-90 wt %, in the negative electrode slurry including the negative electrode active material and optionally the binder and the conductive material.

(3) Separator

Further, the separator functions to interrupt an internal short-circuit between both electrodes and to allow impregnation with an electrolyte. The separator may be prepared by mixing a polymer resin, a filler and a solvent to form a separator composition and coating the separator composition directly on the top of an electrode, followed by drying, to form a separator film. In a variant, the separator may be prepared by casting the separator composition on a support, followed by drying, and laminating the separator film separated from the support on the top of an electrode.

The separator may include a conventional porous polymer film, such as a porous polymer film made of a polyolefin-based polymer, including ethylene homopolymer, propylene homopolymer, ethylene/butene copolymer, ethylene/hexene copolymer or ethylene/methacrylate copolymer, and such porous polymer films may be used alone or in the form of a laminate. Otherwise, a conventional porous non-woven web, such as a non-woven web made of high-melting point glass fibers, polyethylene terephthalate fibers, or the like, may be used with no particular limitation.

Herein, the porous separator may generally have a pore diameter of 0.01-50 μm and a porosity of 5-95%. In addition, the porous separator may generally have a thickness of 5-300 μm.

There is no particular limitation in the appearance of the lithium secondary battery according to an embodiment of the present disclosure. For example, the lithium secondary battery may have a cylindrical shape using a can, a prismatic shape, a pouch-like shape or a coin-like shape.

Next, a composition for a gel polymer electrolyte is injected into the battery casing to which the stack cell is inserted (S2).

In the method for manufacturing a lithium secondary battery according to an embodiment of the present disclosure, the composition for a gel polymer electrolyte may be any one used conventionally for preparing a gel polymer electrolyte, and particularly, may include (a) a lithium salt, (b) a non-aqueous organic solvent, (c) a polymerization initiator, and (d) at least one polymerizable compound selected from the group consisting of a polymerizable monomer, oligomer and copolymer.

(1) Lithium Salt

First, in the composition for a gel polymer electrolyte according to an embodiment of the present disclosure, the lithium salt is used as an electrolyte salt in the lithium secondary battery and as a medium for transporting ions. In general, the lithium salt includes $Li^+$, as a cation, and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$ and $(CF_3CF_2SO_2)_2N^-$, as an anion.

Such lithium salts may be used alone or in combination. The lithium salt may be used in an amount controlled suitably within a generally applicable range. However, the lithium salt may be used at a concentration of 0.5-2 M, particularly 0.9-1.5 M, in the electrolyte in order to obtain an optimized effect of forming a coating film for preventing corrosion on the electrode surface.

Since the composition for a gel polymer electrolyte according to the present disclosure includes an electrolyte salt at 0.5 M or more, it is possible to reduce the resistance caused by depletion of lithium ions during high-rate charge/discharge. Furthermore, when the concentration of the electrolyte salt in the composition for a gel polymer electrolyte according to the present disclosure satisfies the above-defined range, it is possible to ensure high lithium cation ($Li^+$) ion transportability (i.e. cation transference number) by virtue of an increase in lithium cations present in the composition for a gel polymer electrolyte, and to accomplish an effect of reducing diffusion resistance of lithium ions, thereby realizing an effect of improving cycle capacity characteristics.

(2) Non-Aqueous Organic Solvent

The non-aqueous organic solvent is not particularly limited, as long as it causes minimized decomposition caused by oxidation during the charge/discharge cycles of a secondary battery and can realize desired properties in combination with additives. For example, carbonate-based organic solvents, ether-based organic solvents and ester-based organic solvents may be used alone or in combination.

Among such organic solvent, the carbonate-based organic solvent may include at least one of cyclic carbonate-based organic solvents and linear carbonate-based organic solvents. Particular examples of the cyclic carbonate-based organic solvent may include at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and fluoroethylene carbonate (FEC). Particularly, the cyclic carbonate-based organic solvent may include a mixed solvent of ethylene carbonate having a high dielectric constant with propylene carbonate having a relatively lower melting point as compared to ethylene carbonate.

In addition, the linear carbonate-based organic solvent is an organic solvent having a low viscosity and a low dielectric constant, and typical examples thereof may include at least one organic solvent selected from the group consisting of dimethyl carbonate (DMC), diethyl carbonate (DEC), dipropyl carbonate, ethyl methyl carbonate (EMC), methyl propyl carbonate and ethyl propyl carbonate. Particularly, the linear carbonate-based organic solvent may include dimethyl carbonate.

The ether-based organic solvent may include any one selected from the group consisting of dimethyl ether, diethyl ether, dipropyl ether, methyl ethyl ether, methyl propyl ether and ethyl propyl ether, or a mixture of two or more of them. However, the scope of the present disclosure is not limited thereto.

The ester-based organic solvent may include at least one selected from the group consisting of linear ester-based organic solvents and cyclic ester-based organic solvents.

Particular examples of the linear ester-based organic solvent may include any one organic solvent selected from the group consisting of methyl acetate, ethyl acetate, propyl acetate, methyl propionate, ethyl propionate, propyl propionate and butyl propionate, or a mixture of two or more of them. However, the scope of the present disclosure is not limited thereto.

Particular examples of the cyclic ester-based organic solvent may include any one organic solvent selected from the group consisting of γ-butyrolactone, γ-valerolactone, γ-caprolactone, σ-valerolactone and ε-caprolactone, or a mixture of two or more of them. However, the scope of the present disclosure is not limited thereto.

Among such ester-based solvents, the cyclic carbonate-based compound is a high-viscosity organic solvent and can dissociate the lithium salt in the electrolyte well, and thus may be used preferably. When using such a cyclic carbonate-based compound in the form of a mixture with a low-viscosity and low-dielectric linear carbonate-based compound and a linear ester-based compound at a suitable mixing ratio, it is possible to prepare a gel polymer electrolyte having high electrical conductivity preferably.

(3) Polymerization Initiator

The composition for a gel polymer electrolyte according to the present disclosure may include a polymerization initiator in order to carry out a radical reaction required for preparing a gel polymer electrolyte.

The polymerization initiator may include a conventional thermal polymerization initiator or a photopolymerization initiator known to those skilled in the art. For example, the polymerization initiator may be decomposed by heat to form radicals and react with the crosslinking agent through free radical polymerization to form a gel polymer electrolyte.

More particularly, non-limiting examples of the polymerization initiator include, but are not limited to: organic peroxides or hydroperoxides, such as benzoyl peroxide, acetyl peroxide, dilauryl peroxide, di-tert-butylperoxide, t-butyl peroxy-2-ethyl-hexanoate, cumyl hydroperoxide and hydrogen peroxide, at least one azo compound selected from the group consisting of 2,2'-azobis(2-cyanobutane), 2,2'-azobis(methylbutyronitrile), 2,2'-azobis(iso-butyronitrile) (AIBN) and 2,2'-azobisdimethyl valeronitrile (AMVN), or the like.

The polymerization initiator is decomposed by heat (e.g. heat of 30-100° C.) or at room temperature (5-30° C.) in a battery to form radicals, and a polymerizable oligomer reacts with an acrylate compound through free radical polymerization to form a gel polymer electrolyte.

The polymerization initiator may be used in an amount of 0.01-20 parts by weight, particularly 0.1-10 parts by weight, based on 100 parts by weight of the polymerizable compound.

When the polymerization initiator is used with a range of 0.01-20 parts by weight, it is possible to increase the conversion into a gel polymer so that gel polymer electrolyte properties may be ensured, and to prevent a pre-gelling reaction so that the wettability of an electrode with an electrolyte may be improved.

(4) Polymerizable Compound

The polymerizable compound, i.e. polymerizable monomer, oligomer or copolymer, is a compound which has a polymerizable functional group selected from the group consisting of vinyl, epoxy, allyl and (meth)acryl groups and capable of undergoing polymerization in its structure, and can be converted into a gel phase through polymerization or crosslinking. The polymerizable compound is not particularly limited, as long as it is used conventionally as a monomer, oligomer or copolymer for preparing a gel polymer electrolyte.

Particularly, non-limiting examples of the polymerizable monomer include, but are not limited to: tetraethylene glycoldiacrylate, polyethylene glycol diacrylate (molecular weight 50-20,000), 1,4-butanediol diacrylate, 1,6-hexandiol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, poly(ethylene glycol) diglycidylether, 1,5-hexadiene diepoxide, glycerol propoxylate triglycidyl ether, vinylcyclohexene dioxide, 1,2,7,8-diepoxyoctane, 4-vinylcyclohexene dioxide, butyl glycidyl ether, diglycidyl 1,2-cyclohexanedicarboxylate, ethylene glycol diglycidyl ether, glycerol triglycidyl ether, glycidyl methacrylate, or the like. Such compounds may be used alone or in combination.

In addition, typical examples of the copolymer include at least one selected from the group consisting of allyl 1,1,2,2-tetrafluoroethyl ether (TFE)-co-(2,2,2-trifluoroethyl acrylate), TFE-co-vinyl acetate, TFE-co-(2-vinyl-1,3-dioxolane), TFE-co-vinyl methacrylate, TFE-co-acrylonitrile, TFE-co-vinyl acrylate, TFE-co-methyl acrylate, TFE-co-methyl methacrylate (MMA) and TFE-co-2,2,2-trifluoroethyl acrylate (FA).

The polymerizable compound may be used in an amount of 0.01-10 wt % based on the total weight of the composition for a gel polymer electrolyte. When the content of the polymerizable compound is larger than 10 wt %, gelling may occur in an excessively early time, while injecting the composition for a gel polymer electrolyte to a battery, or the composition may become excessively dense to provide a gel having high resistance. On the contrary, when the content of the polymerizable compound is smaller than 0.01 wt %, gelling occurs hardly.

(5) Additives

In addition, the composition for a gel polymer electrolyte according to the present disclosure may further include supplementary additives capable of forming a more stable ion conductive coating film on the surface of an electrode, if necessary, in order to prevent decomposition of the non-aqueous electrolyte and a collapse of the negative electrode under a high-output environment, or to improve low-temperature high-rate discharge characteristics, high-temperature stability, overcharge-preventing effect, battery swelling-inhibiting effect at high temperature, or the like.

Particularly, typical examples of such supplementary additives may include at least one first additive selected from the group consisting of sultone-based compounds, sulfite-based compounds, sulfone-based compounds, sulfate-based compounds, halogen-substituted carbonate-based compounds, nitrile-based compounds, cyclic carbonate-based compounds, phosphate-based compounds, borate-based compounds and lithium salt-based compounds.

The sultone-based compounds may include at least one compound selected from the group consisting of 1,3-propane sultone (PS), 1,4-butane sultone, ethene sultone, 1,3-propene sultone (PRS), 1,4-butene sultone and 1-methyl-1,3-propene sultone, and may be used in an amount of 0.3-5 wt %, particularly 1-5 wt %, based on the total weight of the composition for a gel polymer electrolyte. When the content of the sulfone-based compounds is larger than 5 wt % in the composition for a gel polymer electrolyte, an excessively thick coating film may be formed on the surface of an electrode, resulting in an increase in resistance and degradation of output. Also, in this case, resistance may be increased due to such an excessive amount of additives in the composition for a gel polymer electrolyte to cause degradation of output characteristics.

The sulfite-based compounds may include at least one compound selected from the group consisting of ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimetyl propylene sulfite, 4,6-diethyl propylene sulfite and 1,3-butylene glycol sulfite, and may be used in an amount of 3 wt % or less, based on the total weight of the composition for a gel polymer electrolyte.

The sulfone-based compounds may include at least one compound selected from the group consisting of divinyl sulfone, dimethyl sulfone, diethyl sulfone, methyl ethyl sulfone and methyl vinyl sulfone, and may be used in an amount of 3 wt % or less, based on the total weight of the composition for a gel polymer electrolyte.

The sulfate-based compounds may include ethylene sulfate (Esa), trimethylene sulfate (TMS), or methyl trimethylene sulfate (MTMS), and may be used in an amount of 3 wt % or less, based on the total weight of the composition for a gel polymer electrolyte.

In addition, the halogen-substituted carbonate-based compounds may include fluoroethylene carbonate (FEC), and may be used in an amount of 5 wt % or less, based on the total weight of the composition for a gel polymer electrolyte. When the content of the halogen-substituted carbonate-based compounds is larger than 5 wt %, cell swelling quality may be degraded.

Further, the nitrile-based compounds may include at least one compound selected from the group consisting of succinonitrile, adiponitrile (Adn), acetonitrile, propionitrile, butyronitrile, veleronitrile, caprylonitrile, heptane nitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile and 4-fluorophenylacetonitrile.

The cyclic carbonate-based compounds may include vinylene carbonate (VC) or vinylethylene carbonate, and may be used in an amount of 3 wt % or less, based on the total weight of the composition for a gel polymer electrolyte. When the content of the cyclic carbonate-based compounds is larger than 3 wt %, cell swelling quality may be degraded.

The phosphate-based compounds may include at least one compound selected from the group consisting of lithium difluoro(bisoxalato)phosphate, lithium difluorophosphate $(LiPO_2F_2)$, tetramethyl trimethylsilyl phosphate, trimethylsilyl phosphite, tris(2,2,2-trifluoroethyl) phosphate and tris (trifluoroethyl) phosphite, and may be used in an amount of 3 wt % or less, based on the total weight of the composition for a gel polymer electrolyte.

The borate-based compounds may include lithium oxalyl difluoroborate, and may be used in an amount of 3 wt % or less, based on the total weight of the composition for a gel polymer electrolyte.

The lithium salt-based compounds may include compounds different from the lithium salt contained in the non-aqueous electrolyte, and particularly, at least one compound selected from the group consisting of $LiPO_2F_2$, LiODFB, LiBOB (lithium bisoxalatoborate $(LiB(C_2O_4)_2)$ and $LiBF_4$, and may be used in an amount of 3 wt % or less, based on the total weight of the composition for a gel polymer electrolyte.

Further, two or more of the supplementary additives may be used in combination, and the content of the supplementary additives may be 20 wt % or less, particularly 0.1-10 wt %, based on the total weight of the composition for a gel polymer electrolyte. When the content of the supplementary additives is smaller than 0.01 wt %, it is not possible to obtain sufficient effects of improving the low-temperature output, high-temperature storage characteristics and high-temperature life characteristics of a battery. When the content of the supplementary additives is larger than 20 wt %, excessive side reactions may occur in the composition for a gel polymer electrolyte during the charge/discharge of a battery due to an excessive amount of additives. Particularly, when the additives are added in an excessive amount, they cannot be decomposed sufficiently at high temperature, resulting in formation of unreacted materials in the electrolyte at room temperature or precipitation thereof. In this case, side-reactions may occur to cause degradation of the life or resistance characteristics of a secondary battery.

Then, the battery casing is sealed under oxygen-containing atmosphere (S3). For example, step (S3) may be a step of sealing the battery casing under ambient pressure.

Particularly, the present disclosure is intended to provide an injection-type method for manufacturing a gel polymer electrolyte lithium secondary battery, the method being capable of inhibiting a side reaction of thermal crosslinking of polymerizable monomers in an electrolyte injection step or aging step, and facilitating thermal crosslinking after wetting a cell stack with an electrolyte.

To accomplish this, oxygen is controlled.

Oxygen $(O_2)$ can inhibit the chain reaction of monomers through radical quenching, when radicals are generated by a thermal initiator, or the like. In other words, according to the present disclosure, after the composition for a gel polymer electrolyte is injected to the battery casing to which the stack cell is inserted, the battery casing is sealed under ambient pressure (S3). Therefore, oxygen may be incorporated to the battery casing through the sealing under ambient pressure so that oxygen in the battery casing may react with the radicals generated by the polymerization initiator to inhibit a side-reaction of polymerization of monomers.

For example, step (S3) may be carried out by performing sealing under ambient pressure at 130-150° C. for 1-10 seconds, particularly, at 140-150° C. for 2-3 seconds. In the method for manufacturing a lithium secondary battery according to the present disclosure, the sealing step is performed right after injecting the composition for a gel polymer electrolyte, while not carrying out a deaeration step. Therefore, oxygen may be incorporated to the inner part of the battery casing.

Then, the product of (S3) is aged (S4).

Herein, the aging step may be carried out at room temperature for 72 hours or less so that the electrodes may be wetted sufficiently with the electrolyte injected to the battery casing.

The method for manufacturing a lithium secondary battery according to an embodiment of the present disclosure may further include a vacuum wetting step after the aging step. In other words, when the aging step is carried out under ambient pressure merely, the electrolyte cannot be supplied sufficiently to the micropores in the electrodes, which may result in degradation of wettability. Therefore, in order to improve wettability, a wetting step may be carried out under vacuum. However, the vacuum wetting step is carried out preferably under a vacuum pressure weaker than the conventionally used wetting condition for a short time. Particularly, the vacuum wetting step may be carried out once by forming vacuum atmosphere of −85 kPa to −93 kPa, particularly −93 kPa, for 1-4 minutes.

After that, oxygen is removed from the battery casing (S5).

For example, in step (S5), oxygen introduced during step (S3) may be removed. Particularly, step (S5) may be a step of pressurizing the battery casing.

Figure 2:
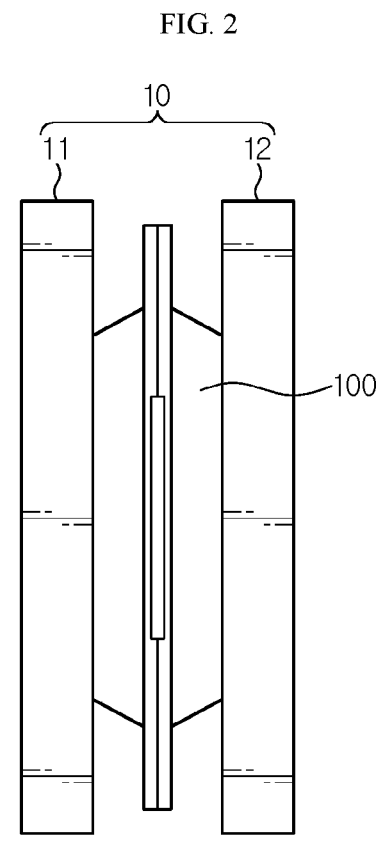

For example, step (S5) may be a step of inserting the battery casing between a pair of jigs facing each other, and applying pressure thereto. Herein, the jigs may include an upper jig 11 and a lower jig 12 as shown in FIG. 2, and the jigs may face each other. The jigs 10 may include any material capable of fixing the battery casing 100.

When applying pressure, the battery casing may be pressurized under a pressure of 3-15 kgf/cm², or 5-10 kgf/cm², by the jigs. In addition, the pressurization may be carried out for 30 seconds to 10 minute, or 1-5 minutes.

Figure 3:
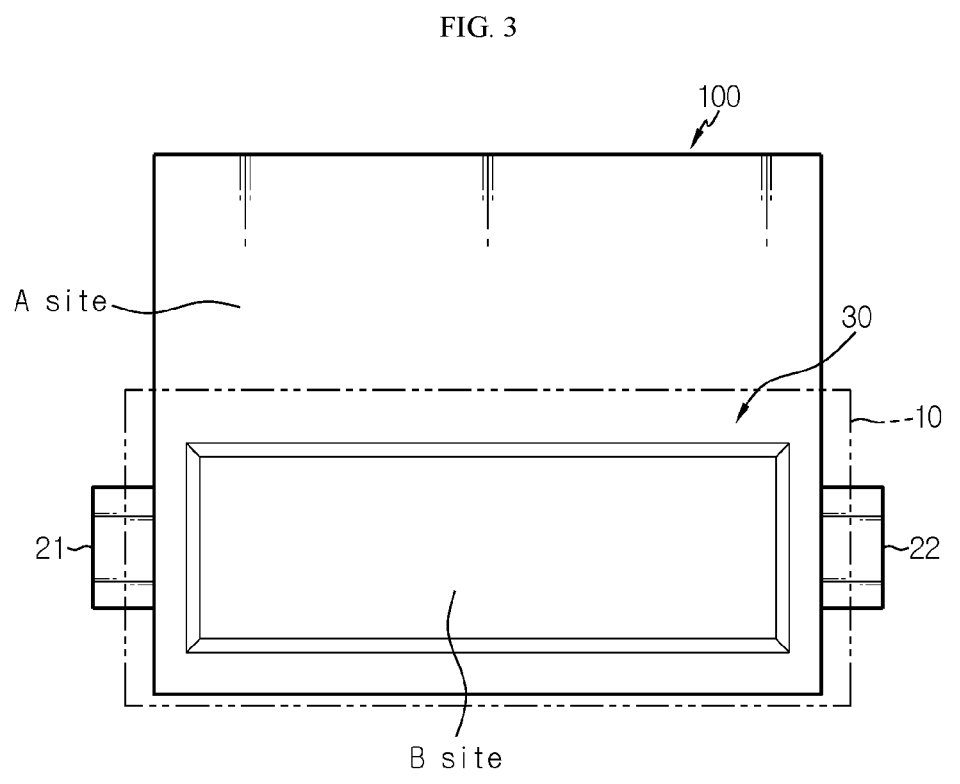

Step (S5) may be a step of pressurizing merely a predetermined portion in the battery casing. For example, as shown in FIG. 3, B site in the pouch 100 is pressurized through the pressurization jigs 10. In this case, oxygen present in B site is transferred to A site. When curing is carried out after pressurization, it is possible to maximize the gel crosslinking degree in B site. Herein, B site may refer to a region where the stack cell is positioned, and A site may refer to a region where the stack cell is not present in the pouch cell.

Then, A site may be removed after thermal curing and before activation. Particularly, after step (S6), the portion, not pressurized in step (S5), may be cut.

Finally, the battery casing is thermally cured (S6).

In the method for manufacturing a lithium secondary battery according to the present disclosure, the composition for a gel polymer electrolyte may be subjected to a curing step at 60-70° C. for 5-24 hours in order to prepare a gel polymer electrolyte.

According to the present disclosure, gelling through polymerization is carried out preferably under an inert condition. When carrying out polymerization under an inert condition, it is possible to interrupt the reaction between oxygen in the air as a radical scavenger and radicals fundamentally so that the extent of polymerization may be increased to such a degree that there are almost no unreacted monomers of a polymer electrolyte. Therefore, it is possible to prevent degradation of charge/discharge characteristics, caused by the retention of a large amount of unreacted monomers in the battery.

The inert atmosphere condition may include low-reactive gases known to those skilled in the art. Particularly, at least one inert gas selected from the group consisting of nitrogen, argon, helium and xenon may be used.

After the gelling is performed through polymerization as described above, a gel polymer electrolyte is formed. Particularly, a gel polymer formed by crosslinking of monomers of a polymer electrolyte through polymerization is prepared, and the resultant gel polymer may be impregnated homogeneously with a liquid electrolyte containing an electrolyte salt dissociated in an electrolyte solvent.

According to the present disclosure, the secondary battery preferably includes a lithium secondary battery, and non-limiting examples of the lithium secondary battery include lithium metal secondary batteries, lithium-ion secondary batteries, lithium polymer secondary batteries, lithium-ion polymer secondary batteries.

Further, after the battery casing is thermally cured, a degassing step of removing the gases present in the battery casing may be carried out.

For example, the degassing step may be performed by pressurizing the battery casing under a pressure of −85 kPa to −95 kPa, or −90 kPa to −95 kPa, for 40-60 minutes to remove the gases remaining in the battery casing. Herein, the battery may be pressurized to reduce the pressure from ambient pressure by the above-defined range.

In another aspect of the present disclosure, there is provided a lithium secondary battery obtained by the method for manufacturing a lithium secondary battery according to an embodiment of the present disclosure, which includes a stack cell provided with a gel polymer electrolyte layer between a positive electrode and a negative electrode, wherein the gel polymer electrolyte layer has a polymer matrix and is formed by thermal curing, the gel polymer electrolyte layer has a crosslinking degree of 80% or more, and the stiffness of the secondary battery is at least 10% higher than the stiffness of a secondary battery not subjected to step (S5).

Herein, the gel polymer electrolyte layer may be prepared through the gelling of the composition for a gel polymer electrolyte. Particularly, the composition for a gel polymer electrolyte may include: (a) a lithium salt, (b) a non-aqueous organic solvent, (c) a polymerization initiator, and (d) at least one polymerizable compound selected from the group consisting of a polymerizable monomer, oligomer and copolymer, as described above.

The crosslinking degree of the gel polymer electrolyte layer may be calculated as a gelling degree of the composition for a gel polymer electrolyte depending on time according to the following Mathematical Formula 1. Particularly, after the electrolyte layer is extracted from the lithium secondary battery, the polymerizable compound present in the electrolyte layer is analyzed quantitatively by using NMR to determine a difference in polymer before and after polymerization. More particularly, NMR is used to carry out quantitative analysis of reactive sites and residual reactive sites of the polymer.

$$\text{Gelling degree (\%)} = 100 - (\text{Residual reactive sites of polymer after polymerization/reactive sites of polymer before polymerization}) \times 100 \text{ [Mathematical Formula 1]}$$

Meanwhile, as used herein, the stiffness may be determined for the central portion of a secondary battery by using an instrument of Texture analyzer Ball type at a speed of 10 mm/min in a distance of 1.2 mm with a trigger force of 50 g.

The stiffness of the secondary battery obtained by the method according to the present disclosure may be at least 10% higher than the stiffness of a conventional secondary battery, particularly, a secondary battery not subjected to step (S5).

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(Manufacture of Cell Stack)

First, 94 wt % of $LiNi_{1/3}Co_{1/3}Mn_{1/3}O_2$ (NCM) as a positive electrode active material, 3 wt % of carbon black as a conductive material and 3 wt % of polyvinylidene fluoride (PVDF) as a binder were added to N-methyl-2-pyrrolidone (NMP) as a solvent to obtain positive electrode active material slurry (solid content: 50 wt %). The positive electrode active material slurry was applied to and dried on aluminum (Al) foil having a thickness of about 20 μm as a positive electrode current collector, followed by roll pressing, to obtain a positive electrode.

In addition, 96 wt % of carbon powder as a negative electrode active material, 3 wt % of PVDF as a binder and 1 wt % of carbon black as a conductive material were added to NMP as a solvent to obtain negative electrode active material slurry (solid content: 80 wt %). The negative electrode active material slurry was applied to and dried on copper (Cu) foil having a thickness of 10 μm as a negative electrode current collector, followed by roll pressing, to obtain a negative electrode.

The positive electrode, the negative electrode and a separator including three layers of polypropylene/polyethylene/polypropylene (PP/PE/PP) were stacked successively to obtain a stack cell.

(Preparation of Composition for Gel Polymer Electrolyte)

First, $LiPF_6$ was dissolved in a non-aqueous organic solvent having a composition of ethylene carbonate (EC): ethyl methyl carbonate (EMC)=30:70 (volume ratio) to 1.0 M, thereby preparing 96.96 g of a non-aqueous electrolyte. Next, 5 wt % of trimethylolpropane triacrylate as a polymerizable compound and 0.02 wt % of AIBN as a polymerization initiator, based on 100 wt % of the composition for a gel polymer electrolyte, were added to the non-aqueous electrolyte to prepare a composition for a gel polymer electrolyte.

(Manufacture of Lithium Secondary Battery)

The stack cell was inserted into a battery casing, and the composition for a gel polymer electrolyte was injected thereto.

Next, the battery casing was sealed under oxygen-containing atmosphere with ambient pressure at 140° C. for 2 seconds and allowed to stand at room temperature for 3 days.

Then, the battery casing was pressurized by using the jig members as shown in FIG. 2 under a pressure of 5 kgf/cm² for 1 minute.

Finally, the battery casing was heated at 65° C. for 5 hours to obtain a lithium secondary battery including a thermally polymerized gel polymer electrolyte. The test results for the lithium secondary battery are shown in Table 1.

Example 2

A lithium secondary battery was obtained in the same manner as Example 1, except that the battery casing was pressurized by using the jig members as shown in FIG. 2 under a pressure of 5 kgf/cm² for 5 minutes. The test results for the lithium secondary battery are shown in Table 1.

Example 3

A lithium secondary battery was obtained in the same manner as Example 1, except that the battery casing was pressurized by using the jig members as shown in FIG. 2 under a pressure of 10 kgf/cm² for 1 minute. The test results for the lithium secondary battery are shown in Table 1.

Example 4

A lithium secondary battery was obtained in the same manner as Example 1, except that the battery casing was pressurized by using the jig members as shown in FIG. 2 under a pressure of 10 kgf/cm² for 5 minutes. The test results for the lithium secondary battery are shown in Table 1.

Comparative Example 1

In Comparative Example 1, the crosslinking agent and polymerization initiator were not added in preparing the composition for an electrolyte, as compared to Example 1. In other words, a conventional non-aqueous electrolyte was prepared instead of a composition for a gel polymer electrolyte. In addition, as compared to Example 1, the battery casing was sealed under vacuum. In other words, since the battery casing was sealed under vacuum, the atmosphere was free from 02.

(Preparation of Non-Aqueous Electrolyte)

Particularly, a non-aqueous electrolyte was prepared as follows.

$LiPF_6$ was dissolved in a non-aqueous organic solvent having a composition of ethylene carbonate (EC):ethyl methyl carbonate (EMC)=30:70 (volume ratio) to 1.0 M, thereby preparing 96.96 g of a non-aqueous electrolyte.

(Manufacture of Lithium Secondary Battery)

The stack cell was inserted into a battery casing, and the non-aqueous electrolyte was injected thereto.

Next, the battery casing was sealed under vacuum at 140° C. for 2 seconds and allowed to stand at room temperature for 3 days to obtain a lithium secondary battery. The test results for the lithium secondary battery are shown in Table 1.

Comparative Example 2

In Comparative Example 2, the battery casing was sealed under vacuum and was not subjected to the jig process, as compared to Example 1. In other words, since the battery casing was sealed under vacuum, the atmosphere was free from 02.

Particularly, the stack cell and the composition for a gel polymer electrolyte obtained according to Example 1 were used to obtain a lithium secondary battery as follows.

(Manufacture of Lithium Secondary Battery)

The stack cell was inserted into a battery casing, and the composition for a gel polymer electrolyte was injected thereto.

Next, the battery casing was sealed under vacuum at 140° C. for 2 seconds and allowed to stand at room temperature for 3 days. Finally, the battery casing was heated at 65° C. for 5 hours to obtain a lithium secondary battery including a thermally polymerized gel polymer electrolyte. The test results for the lithium secondary battery are shown in Table 1.

Comparative Example 3

In Comparative Example 3, the battery casing was not subjected to the jig process, after it was sealed, as compared to Example 1. In other words, 02 was not removed from the battery casing.

Particularly, the stack cell and the composition for a gel polymer electrolyte obtained according to Example 1 were used to obtain a lithium secondary battery as follows.

(Manufacture of Lithium Secondary Battery)

The stack cell was inserted into a battery casing, and the composition for a gel polymer electrolyte was injected thereto.

Next, the battery casing was sealed under ambient pressure at 140° C. for 2 seconds and allowed to stand at room temperature for 3 days. Finally, the battery casing was heated at 65° C. for 5 hours to obtain a lithium secondary battery including a thermally polymerized gel polymer electrolyte. The test results for the lithium secondary battery are shown in Table 1.

TABLE 1

| | Cross-linking degree during wetting | Cross-linking degree after curing | Stiff-ness (%) ** | Nail penetration (diameter 3 mm) | Nail penetration (diameter 5 mm) |
|---|---|---|---|---|---|
| Ex. 1 | 0.8% | 80.7% | 168% | 3/3 (Pass/total) | 2/3 (Pass/total) |
| Ex. 2 | | 82.6% | 167% | 3/3 (Pass/total) | 2/3 (Pass/total) |
| Ex. 3 | | 94.8% | 208% | 3/3 (Pass/total) | 3/3 (Pass/total) |
| Ex. 4 | | 95.0% | 210% | 3/3 (Pass/total) | 3/3 (Pass/total) |
| Comp. Ex. 1 | — | — | 45% | 0/3 (Pass/total) | 0/3 (Pass/total) |

19

TABLE 1-continued

| | Cross-linking degree during wetting | Cross-linking degree after curing | Stiff-ness (%) ** | Nail penetration (diameter 3 mm) | Nail penetration (diameter 5 mm) |
|---|---|---|---|---|---|
| Comp. Ex. 2 | 48.0% | 93.2% | 58% | 1/3 (Pass/total) | 0/3 (Pass/total) |
| Comp. Ex. 3 | 0.8% | 58.4% | 100% | 3/3 (Pass/total) | 0/3 (Pass/total) |

** Stiffness: values expressed based on the cell stiffness of Example 3 taken as 100% and in the unit of gf/mm.

TEST EXAMPLES

Test Example 1: Determination of Crosslinking Degree in Each Step

The crosslinking degree of each of the lithium secondary batteries according to Examples 1-4 and Comparative Examples 1-3 was determined as follows.

Particularly, the separator was introduced to the composition for a gel polymer electrolyte, and the gelling degree depending on time was calculated according to the following Mathematical Formula 1. More particularly, the polymerizable compound present in the composition for a gel polymer electrolyte was analyzed quantitatively by using NMR to determine a difference in polymer before and after polymerization. More particularly, NMR was used to carry out quantitative analysis of reactive sites and residual reactive sites of the polymer.

$$\text{Gelling degree (\%)} = 100 - (\text{Residual reactive sites of polymer after polymerization/reactive sites of polymer before polymerization}) \times 100 \quad \text{[Mathematical Formula 1]}$$

Test Example 2: Method for Determining and Calculating Stiffness of Lithium Secondary Battery The stiffness of the lithium secondary battery according to Comparative Example 1 was determined for its central portion by using an instrument of Texture analyzer Ball type at a speed of 10 mm/min in a distance of 1.2 mm with a trigger force of 50 g.

Then, the stiffness of each of the other Examples and Comparative Examples was calculated based on the stiffness of Comparative Example 3 taken as 100%.

Test Example 3: Evaluation of Safety Through Nail Penetration Test

Each of the lithium secondary batteries according to Examples 1-4 and Comparative Examples 1-3 was fully charged at room temperature to 4.4 V, and a nail penetration test was carried out under the condition of GB/T (nail diameter 2.5 mm, penetration speed 6 m/min). The test results are shown in Table 1.

As can be seen from Table 1, in the case of Examples 1-4, the crosslinking degree during electrolyte wetting is reduced and the crosslinking degree after curing is increased in each lithium secondary battery. In addition, it can be seen that each battery shows increased stiffness.

On the contrary, in the case of Comparative Example 1 in which any polymerization initiator and polymerizable compound are not introduced, curing itself does not occur.

In the case of Comparative Example 2 in which the battery is sealed under vacuum and is not subjected to the jig process, it is not possible to inhibit side reactions occurring during wetting due to the absence of oxygen introduction itself, and the crosslinking degree during wetting is increased rapidly.

In the case of Comparative Example 3 in which the battery is sealed under ambient pressure, the crosslinking degree during wetting is reduced, and the crosslinking degree after curing is as low as 58.4% due to the absence of a step of removing oxygen.

DESCRIPTION OF MAIN ELEMENTS

100: Pouch cell
A site: Non-pressurized portion
B site: Pressurized portion
21: Positive electrode tab
22: Negative electrode tab
10, 11, 12: Pressurization jig
30: Stack cell

What is claimed is:

1. A method for manufacturing a lithium secondary battery, comprising:
    inserting a stack cell comprising a separator interposed between a positive electrode and a negative electrode to a battery casing;
    injecting a composition for a gel polymer electrolyte into the battery casing to which the stack cell is inserted;
    sealing the battery casing under oxygen-containing atmosphere;
    aging the battery casing after the sealing;
    removing oxygen from the battery casing;
    thermally curing the battery casing; and
    degassing by pressurizing the battery casing to remove the gases remaining in the battery, wherein the removing oxygen is a step of pressurizing the battery casing, by pressurizing a region where the electrode assembly is positioned, oxygen present in the region wherein the electrode assembly is positioned is transferred to a region where the electrode assembly is not present.

2. The method according to claim 1, wherein the sealing is carried out at 130-150° C. for 1-10 seconds.

3. The method according to claim 1, wherein the aging is carried out at room temperature for 72 hours or less.

4. The method according to claim 1, wherein the removing oxygen comprises inserting the battery casing between a pair of jigs facing each other and applying pressure thereto.

5. The method according to claim 4, wherein the removing oxygen comprises pressurizing merely a predetermined portion in the battery casing.

6. The method according to claim 1 wherein a portion of the battery casing where not pressurized is removed after the thermally curing the battery casing.

7. The method according to claim 1, wherein the removing oxygen is carried out under a pressure of 3-15 kgf/cm².

8. The method according to claim 7, wherein the removing oxygen is carried out for 30 seconds to 10 minutes.

9. The method according to claim 1, wherein the thermally curing the battery casing is carried out at a temperature of 60-70° C.

10. The method according to claim 9, wherein the thermally curing the battery casing is carried out for 5-24 hours.

11. The method according to claim 1, wherein the composition for the gel polymer electrolyte comprises: a lithium salt; a non-aqueous organic solvent; a polymerization initiator; and at least one polymerizable compound selected from the group consisting of a polymerizable monomer, oligomer and copolymer.

12. A lithium secondary battery obtained by the method according to claim 1, comprising the stack cell provided with the gel polymer electrolyte layer between the positive electrode and the a negative electrode, wherein the gel polymer electrolyte layer has a polymer matrix and is formed by thermal curing, the gel polymer electrolyte layer has a crosslinking degree of 80% or more, and the stiffness of the secondary battery is at least 10% higher than the stiffness of a secondary battery not subjected to the removing oxygen.

13. The method according to claim 1, wherein an oxygen included in oxygen-containing atmosphere inhibits a chain reaction of monomers of the gel polymer electrolyte through radical quenching.

14. The method according to claim 1, wherein the method further includes after the thermally curing the battery casing, degassing by pressurizing the battery casing under a pressure of –85 kPa to –95 kPa for 40-60 minutes to remove the gases remaining in the battery.

\* \* \* \* \*